United States Patent [19]

Peabody

[11] 4,231,036
[45] Oct. 28, 1980

[54] BLIP SCAN ANALYZER

[75] Inventor: Roger H. Peabody, Kings Park, N.Y.

[73] Assignee: The United States of America as represented by the Secretary of the Navy, Washington, D.C.

[21] Appl. No.: 789,393

[22] Filed: Apr. 21, 1977

[51] Int. Cl.³ .......................... G01S 7/22; H03K 3/017
[52] U.S. Cl. ............................... 343/5 EM; 343/5 R; 307/265
[58] Field of Search .............. 343/5 R, 17.1 R, 5 EM; 315/378; 307/108, 265

[56] References Cited

U.S. PATENT DOCUMENTS

| 3,050,723 | 8/1962 | Atlas | 343/5 R |
| 3,287,726 | 11/1966 | Atlas | 343/17.1 R |

Primary Examiner—Malcolm F. Hubler
Attorney, Agent, or Firm—R. S. Sciascia; Paul S. Collignon

[57] ABSTRACT

An improved signal processing technique for providing rapid evaluation of target echoes on a pulse by pulse basis. An analyzing circuit is constructed to receive pulse echoes from a signal transmitting system and convert the pulses to provide amplitude data through a pulse height to pulse width converter. When used in a radar system, each echo pulse is converted to a fixed amplitude pulse with a pulse width proportional to the echo amplitude as the antenna sweeps by the target. The pulses are thereafter transmitted to a display device in place of the normal radar video. The resultant display provides a real time two-dimensional amplitude pattern which enhances target detectability in the presence of noise and in multiple target environments.

2 Claims, 4 Drawing Figures

BLIP SCAN ANALYZER

BACKGROUND OF THE INVENTION

The present invention relates to a signal processing system and more particularly to a wave shaping technique for permitting the rapid evaluation of signal echo amplitude data on a pulse by pulse basis.

Generally, in signal processing systems such as radar or sonar systems, wherein echo signals are utilized to provide target information, various techniques have been proposed to improve the ability of the system to resolve multiple targets with less interference from system characteristics or noise. With the advent of track-while-scan computers, target location and estimation techniques have become particularly important in providing a basis for identifying targets under different environmental conditions. Most prior target detectors and location estimators relay upon the shape of the antenna scan profile and the number of hits per scan (with the particular antenna pattern), as the antenna passes through the area of the target, to provide accurate target detection. The accuracy of such detectors and estimators, however, is dependent upon the reproducibility of the target echo pattern for a given antenna pattern. While conventional radar displays have been constructed to provide target echo patterns that provide strong signals and minimal interference in accordance with the above scanning, various problems have been encountered which limit the system performance. In particular, certain disturbances which occur with relatively great frequency have a significant effect on the target echo pattern so that weaker echoes are modified significantly from those of strong signal echoes. In addition, disturbances such as multipath transmissions, which are more unpredictable and occur with less frequency, also provide significant echo distortion which alters target echo patterns. As a result, the standard radar display devices have been ineffective in providing signal data output which will provide for increased target detection or improved signal content of target echo patterns for use by detection and estimation devices.

In view of the present trend toward computerized command control systems, there is therefore a real need for more effective techniques for providing patterns which will facilitate evaluation by target detection and location processors. Such techniques are required to allow the automatic tracking of targets for coordination with vehicle control systems for quick response to multiple threats. These automatic target detectors, however, must be able to obtain precise target amplitude versus azimuth data in order to increase the effectiveness of data analysis. The data should be obtained from the particular vehicle signaling system and must be able to account for multipath effects on apparent amplitude pattern of the target. In dealing with this problem, previous techniques have utilized cathode ray tube displays (A-scopes) and high speed rapidly advancing photographic film with limited success. Still other techniques have utilized sample and hold devices which require the manual positioning of a ranging gate to enclose a signal target or, alternatively, expensive memory systems to acquire data on many targets. All such techniques have suffered from high expense, difficulty in use, and lengthy post acquisition data processing which has curtailed their effectiveness. Consequently, application to real time threats in multiple target environments has been severely limited.

Accordingly, the present invention has been developed to overcome the shortcomings of the above-known and similar techniques and to provide a wave shaping technique for obtaining target amplitude versus azimuth information for use with target detection and location estimation processors.

SUMMARY OF THE INVENTION

It is therefore an object of the invention to provide a signal processing technique which will improve the capability of target detection in multiple target and noisy environments.

Another object of the invention is to provide a signal processing technique for evaluating signal echo amplitude information on a pulse to pulse basis.

A further object of the invention is to provide a signal processing technique which provides pulse amplitude to pulse width conversion.

Still another object of the invention is to provide an improved target signature in a signal processing system.

Yet another object of the invention is to provide a pulse amplitude to pulse width conversion technique which may be incorporated in radar display devices for providing precise amplitude profiles from the range and azimuth circuitry.

In order to accomplish the above and other objects, the present technique utilizes a blip scan analyzer (BSA) to convert a radar video output to an amplitude profile on the signal processing display. The analyzer utilizes a capacitor charging circuit to stretch the radar video in a time proportionate to the video amplitude and provides a pulsed output which can be displayed on a standard plan position indicator (PPI) or B scan display device. When a radar echo is initially received, the charging circuit is rapidly charged to a value indicative of the amplitude of the echo. The circuit is subsequently allowed to discharge at a predetermined rate and applied to a pulse shaping circuit which will create a constant amplitude pulse output proportional in width to the amplitude of the echo pulse. The constant amplitude pulse is thereafter applied to the standard radar display which provides a visual output representative of the amplitude of the echo. Since the pulses are displayed in place of the radar video, they are synchronous therewith and appear on the display as individual line segments extending from the range of the target for a length proportional to each echo amplitude. The resultant amplitude pattern, as displayed on the output of the device as the radar tracks, consists of a phosphor image of all the echoes representing a target signature. Since the BSA is providing a two-dimensional representation of the target in lieu of the normal PPI displays, the target signatures provide improved sensitivity and target detectability for detection and analysis.

Other objects, advantages and novel features of the invention will become apparent from the following detailed description when considered with the accompanying drawings wherein:

DETAILED DESCRIPTION OF A PREFERRED EMBODIMENT

Figure 1:
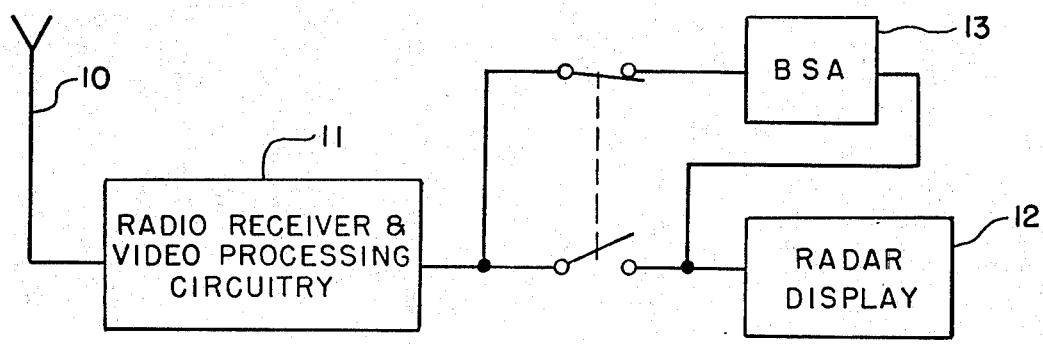
FIG. 1 is a schematic diagram of a radar processing system using the circuitry of the present invention.

Referring now to FIG. 1, the schematic diagram illustrates the processing system and technique in accordance with the teachings of the present invention. In the present instance, the signal processing system will be described with reference to a radar receiving system, although the teachings are equally applicable to other processing systems known in the art. Generally, a radar transmitter (not shown) generates a series of modulated pulses at a selected carrier frequency which are radiated in accordance with the antenna pattern and azimuth direction in a manner well known in the art. Upon encountering a target, such pulses are reflected to form a target echo signal which is received at the antenna 10 when positioned in the appropriate direction. The received echo signals are subsequently transmitted to conventional radar receiving circuitry 11 which produces a radar video output representative of the range and azimuth of the target. As is known, the length of time between the transmission of the radar pulse and the return of the target echo signal is directly proportional to the range of the target, while the position of the antenna indicates the azimuth of the target. The signal representing the video output is thereafter coupled to a conventional cathode ray display device (such as a PPI or B scope) to visually display the target echo. Normally, the radar video output can be represented as a voltage $V_i(t)$ as is illustrated in FIG. 3a wherein the output signal consists of low level amplitude peaks created by noise and high amplitude peaks representing the target echo signal. When transmitted to the cathode ray tube display devices, the visual images created by the pulses on the phosphor screen are located at positions on the display equivalent to the range of the target and having an intensity proportional to the amplitude of the target echo signal. As can be seen, the ability of the display to provide effective target detection will be determined by the capability of an operator or processor to distinguish between high and low intensity light on the scope and the ability of additional threshold circuitry to establish a level which will eliminate noise from the display. Because of the variety of problems created by noise in the receiver system and multipath effects, the conventional display output does not readily facilitate effective target recognition and discrimination in multiple target and interference environments.

While the above system could provide various visual interpretations, the problems become even more acute when the video output is to be processed by automated target detection and estimation processes. Because of the relation between the antenna pattern and target signature, most automated techniques are constructed to take into account the antenna pattern in evaluating the presence of a target upon receipt of a target echo amplitude pattern. Since the conventional radar video is sensitive to external factors, however, the similarity or dissimilarity of target echo patterns for a given antenna pattern cannot be insured to enable a statistical evaluation of the effectiveness of a detection and estimation technique. Accordingly, there is increased reliance on operator interpretation for target detection while the more accurate computer evaluations are neglected.

Figure 3:
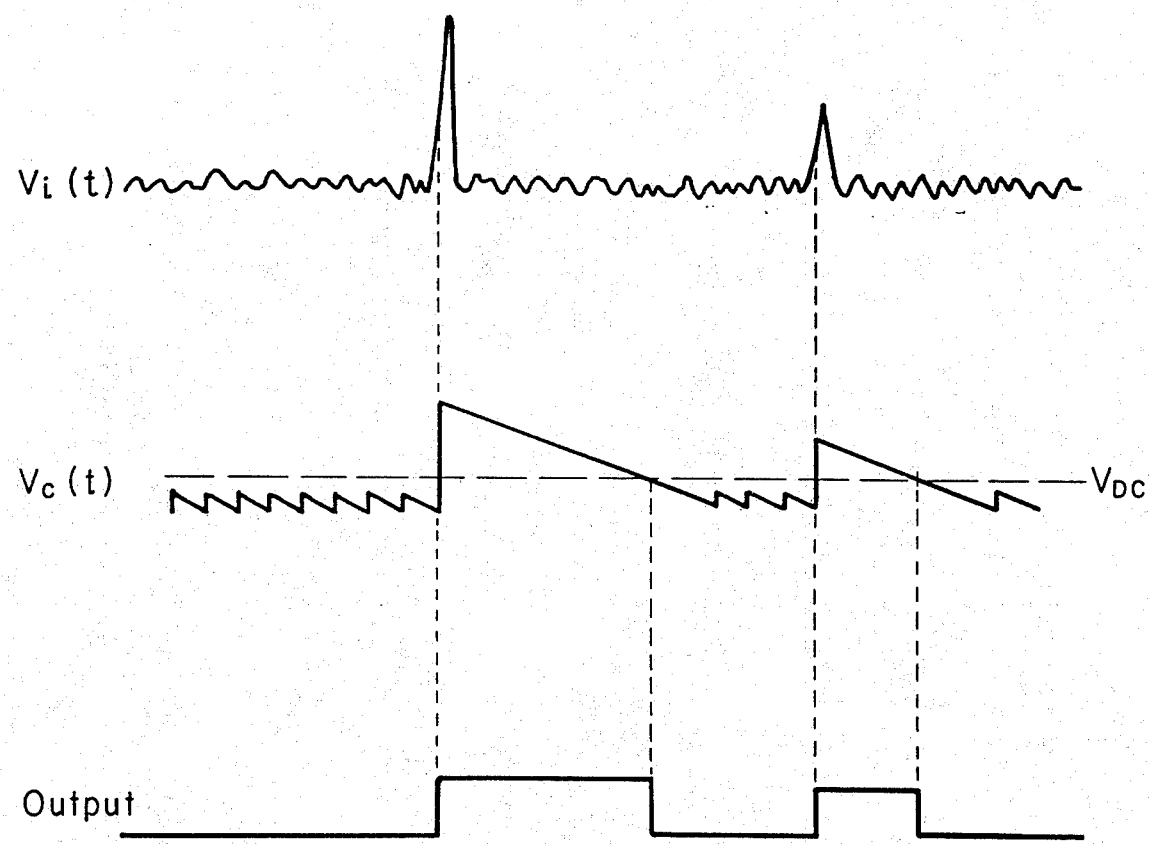
FIG. 3 is a schematic diagram showing the waveforms representing target echo return and the resulting wave shapes for conversion from pulse amplitude to pulse width.

In order to overcome the noted problems associated with conventional display and target detection techniques, therefore, the present invention utilizes a blip scan analyzer 13 which operates on the radar video to produce a wave shape that permits rapid evaluation of search radar target echo amplitude data on a real time pulse by pulse basis. The circuit 13 is coupled to the output of the radar video circuitry 11 in such manner that it may be selectively inserted in series with the conventional radar display 12. The effect of this circuit is to provide a modified signal which stretches the radar video in a time proportional to the video amplitude and which displays the modified signal on the standard PPI or B scan display. As the radar sweeps by a target, each individual target echo is converted to a fixed amplitude pulse with a pulse width proportional to the amplitude of the echo in the radar video. This technique may be more easily visualized by reference to FIG. 3 wherein the typical waveforms produced during conversion of the radar video ($V_i(t)$—) are shown. According to the invention, the radar video $V_i(t)$ from the output of 11 is provided to a capacitor charging circuit of device 13 to produce a voltage proportional to the video amplitude. That voltage is then permitted to discharge at a constant rate to form a waveform ($V_c(t)$) corresponding to the stretched voltage waveform shown in FIG. 3. The voltage $V_c(t)$ is thereafter coupled to a voltage threshold circuit which produces a constant pulse output as long as the voltage ($V_c(t)$) exceeds the threshold level. The resultant signal output is a constant amplitude pulse having a pulse width proportional to the amplitude of the radar video $V_i(t)$. It should be noted that as the radar video amplitude increases, the pulse width of the BSA output also increases. The threshold voltage $V_{DC}$ is then set so that there is a high probability that a target echo signal will exceed the threshold voltage and a low probability that receiver noise will exceed the threshold voltage. When applied to the conventional radar display, the output pulses of FIG. 3 are synchronous with the radar pulses from the radar video. The output display is therefore a two-dimensional amplitude pattern consisting of constant intensity phosphor line segments for each pulse extending from the range position on the display and having a length proportional to the echo amplitude.

Figure 2:
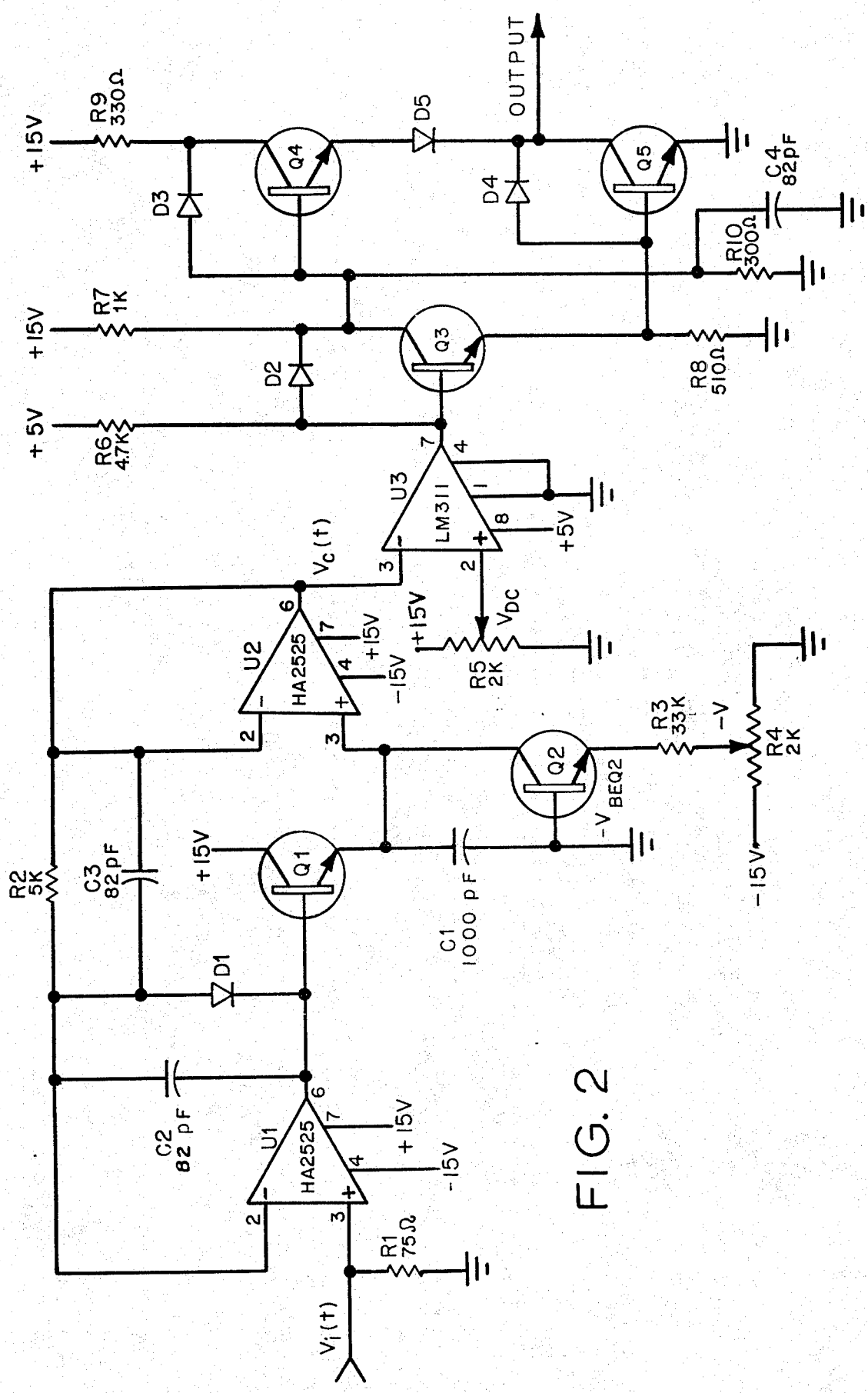
FIG. 2 is a schematic diagram of the blip scan analyzing circuitry for providing pulse amplitude to pulse width conversion in accordance with the present invention.

Turning now to FIG. 2, a circuit forming the BSA 13 is schematically illustrated. The circuit generally consists of an operational amplifier $U_1$ having its positive terminal coupled to receive the radar video signal $V_i(t)$ and connected through resistor $R_1$ to ground. The output from $U_1$ provides an amplified signal which is coupled to one terminal of capacitor $C_2$ and the cathode of diode $D_1$ and as input to the base of transistor switch $Q_1$. The other terminal of $C_2$ and the anode of $D_1$ are coupled to the negative input of $U_1$ and in series with the parallel combination of the resistor $R_2$ and capacitor $C_3$. The other terminals of $C_3$ and $R_2$ are in turn coupled to the output and negative input of operational amplifier $U_2$. In operation, the connection of elements $C_2$ and $C_3$ prevents overshoot of the radar video signal during charging of the capacitor $C_1$. The emitter of $Q_1$ is coupled to one terminal of capacitor $C_1$, to the positive terminal of $U_2$, and to the collector of $Q_2$. The other terminal of $C_1$ is connected to ground and to the base of transistor $Q_2$ which has its emitter coupled through $R_3$ to potentiometer $R_4$ to ground. The output $V_c(t)$ of $U_2$ is coupled to the negative input of operational amplifier $U_3$ which has its positive input coupled through variable resistor $R_5$ to regulate the threshold voltage $V_{DC}$. The amplifier $U_3$ operates as a comparator and provides an output signal when the voltage $V_c(t)$ exceeds the voltage set by the resistor $R_5$. The output of $U_3$ is then coupled to a pulse driving circuit formed from transistors $Q_3$ to $Q_5$. Transistor $Q_3$ has its base coupled to the output of $U_3$, to the anode of $D_2$, and through resistor $R_6$ to a biasing voltage. The collector of $Q_3$ is coupled to the cathode of $D_2$, to the anode of $D_3$, to the base of $Q_4$, through the parallel combination of resistor $R_{10}$ and capacitor $C_4$ to ground, and through the resistor $R_7$ to a biasing voltage. The emitter of $Q_3$ is coupled through resistor $R_8$ to ground, to the base of $Q_5$, and to the anode of $D_4$. The collector of $Q_4$ is coupled to the cathode of $D_3$ and through resistor $R_9$ to a biasing voltage. The emitter from $Q_4$ is coupled to the anode of $D_5$ which has its cathode coupled to the cathode of $D_4$ and to the collector of $Q_5$ to provide the pulse output terminal. The emitter of $Q_5$ is thereafter coupled to ground.

In operation, the radar video $V_f(t)$ is applied to the input of $U_1$ to produce a voltage output at the base of $Q_1$ which tracks the radar video. When the voltage $V_c(t)$ is less than $V_f(t)$, the capacitor $C_1$ will charge through transistor $Q_1$ with voltage overshoot being prevented by the specific coupling of capacitors $C_2$ and $C_3$. When the value of $V_c(t)$ becomes greater than $V_f(t)$, transistor $Q_2$ will act to discharge the capacitor $C_1$ at a constant rate through resistors $R_3$ and $R_4$ to ground. The rate of discharge can be determined by adjusting the value of potentiometer $R_4$ while the rate of charge can be controlled by changing the value of $C_1$. The voltage output $V_c(t)$ is thereafter provided to comparator $U_3$ and generally follows the discharge of capacitor $C_1$ in the manner as shown by FIG. 3b. When the output $V_c(t)$ exceeds the threshold $V_{DC}$ as fixed by the resistor $R_5$, the output from $U_3$ will drive the circuit formed from transistors $Q_3$-$Q_5$ to produce a constant amplitude pulse output. The length of the pulse output will therefore be equal to the time period that $V_c(t)$ exceeds the threshold level $V_{DC}$ and will be proportional to the amplitude of the radar video.

In implementing the circuit shown in FIG. 3, all amplifiers $U_1$ to $U_3$ and transistors $Q_1$-$Q_5$ were biased with the identified voltages for the desired operational values. In this particular example, transistors $Q_1$-$Q_5$ were type 2N2219A, $D_1$ and $D_5$ type FD333, and $D_2$-$D_4$ were Schottky diodes coupled in the manner indicated to prevent transistors $Q_1$-$Q_5$ from saturating and to eliminate storage time delays. In addition, pins 8 of $U_1$ and $U_2$ were coupled through 30 pf capacitors to ground while pins 4 and 7 of $U_1$ and $U_2$ were connected through 0.1 $\mu$F to ground. All other element values and connections were established as indicated in the drawing.

Using the above described circuitry, the disclosed technique was capable of providing output pulses in response to radar video pulses having a pulse width of 2 ns without any significant degradation of the video display. While this particular response is considered desirable for normal tracking operations, various modifications of the element values may obviously be made to accommodate specific conditions necessitated by different radar parameters. As has been previously noted, the modified pulse output of the present technique allows significant increases in target detection sensitivity, yet only minor and inexpensive modifications to the radar circuitry. Such technique allows the target threshold to be easily modified to increase the probability of target detection. In addition, the previously described technique provides a target echo signal that is relatively independent of noise and multipath disturbances such as to allow the use of and evaluation of the automated target detection and location estimation processors. When employed as a selectable circuit in series with the conventional PPI or B scope, the amplitude profile produced provides enhanced visual target detectability and target signature characteristics critical for target tracking. All of these are advantages that have not been previously recognized in the prior art.

While the present invention has been described with the particular reference to the circuit of FIG. 2, it is obvious various modifications can be made in accordance with the inventive teachings. The BSA circuit 13 may therefore consist of any automated peak detecting and pulse stretching circuitry capable of converting the radar video to a constant amplitude pule having a width proportional to the amplitude. Obviously, many other variations and modifications of the present invention are possible in light of the above teachings. It is therefore to be understood that within the scope of the appended claims the invention may be practiced otherwise than as specifically described.

What is claimed and desired to be secured by letters patent of the United States is:

1. A device for improving target detection and identification in a signal processing system comprising:
   means for providing a plurality of variable amplitude echo signals representing target information; and
   means responsive to said signals for forming a two-dimensional amplitude pattern representing a target wherein said amplitude pattern is formed as a plurality of illuminated line segments with each segment extending from a target range for a length proportional to an individual echo signal amplitude, said means for forming the two-dimensional amplitude pattern comprising,
   a charging circuit coupled to receive each of said variable amplitude echo signals and provide a voltage output for each received signal,
   a discharge circuit coupled to receive each voltage output and discharge said voltage at a given rate,
   a threshold circuit coupled to said voltage output for providing a threshold signal when said voltage output is above a predetermined threshold,
   means responsive to said threshold signal for providing a constant amplitude pulse having a pulse width equal to the time that the voltage exceeds said threshold, and
   means responsive to each of said pulses for forming the line segments.

2. A device for improving target detection and identification in a signal processing system comprising:
   means for providing a plurality of variable amplitude signals representing target information;
   a charging circuit coupled to receive each of said variable amplitude signals and provide a voltage output for each received signal;
   a discharge circuit coupled to receive each voltage output and provide a constant discharge rate;
   a threshold circuit coupled to said voltage output for providing a threshold signal when said voltage output is above a predetermined threshold;
   means responsive to said threshold signal for providing a constant amplitude pulse having a pulse width equal to the time that the voltage exceeds said threshold; and
   means responsive to each of said pulses for developing a two-dimensional amplitude pattern.

* * * * *